Dec. 30, 1958

J. S. MICHIE 2,866,331

FLOW MEASURING AND SIGNALLING MECHANISM

Filed Jan. 14, 1955

INVENTOR.
JOHN S. MICHIE,
BY Harold B. Hood.
ATTORNEY

Dec. 30, 1958

J. S. MICHIE 2,866,331

FLOW MEASURING AND SIGNALLING MECHANISM

Filed Jan. 14, 1955

INVENTOR.
JOHN S. MICHIE,
BY Harold B. Hood.
ATTORNEY

United States Patent Office 2,866,331
Patented Dec. 30, 1958

2,866,331

FLOW MEASURING AND SIGNALLING MECHANISM

John S. Michie, Columbus, Ind.

Application January 14, 1955, Serial No. 481,805

10 Claims. (Cl. 73—113)

The present invention relates to a flow measuring and signalling mechanism which, in its several forms, may find primary utility when installed in an automotive vehicle to measure fuel flow to the engine thereof. A primary object of the invention is to provide an installation for automobiles which, when manually activated, will measure the flow of a predetermined volume of fuel to the engine, and then will automatically stop and call attention to the fact that such predetermined volume has passed the measuring device.

A further object of the invention is to provide an improved flow meter including a bladed rotor which, when it is free to turn, will be driven, at a rate proportional to the rate of fluid volume flow, but which, when it is restrained against rotation, will permit fluid flow therepast by yieldable flexure of its blades.

A further object of the invention is to provide a flow meter consisting of a pair of inversely-variable-volume chambers separated by a movable wall with which, in a preferred form of the device, is associated a flexible wall, said chamber being in communication with a fluid flow conduit, respectively at opposite sides of a conduit-closing valve.

A further object of the invention is to provide, in association with a flow meter of the character just outlined, means whereby the discharge of a predetermined volume of fluid from one of said chambers will result in conduit-opening actuation of said valve, and will further affect a signalling circuit to call attention to the completion of such discharge.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
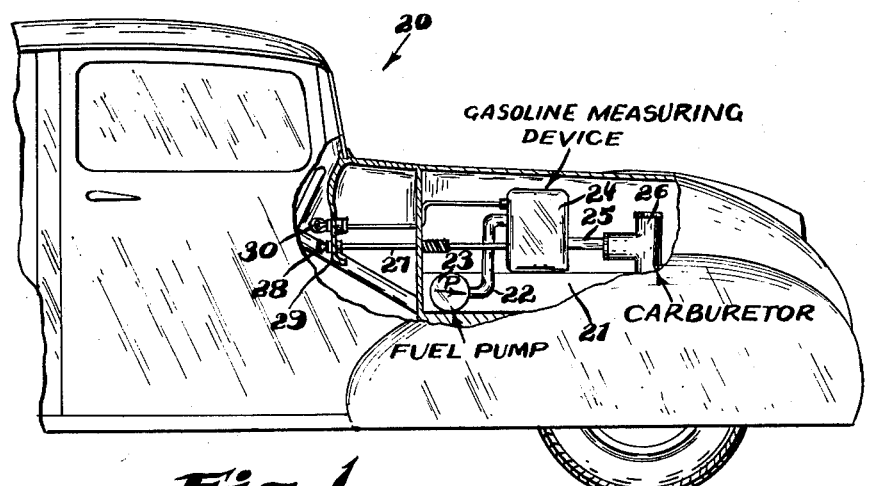
Fig. 1 is a somewhat diagrammatic illustration of a conventional automotive vehicle, parts being broken away to indicate the manner of installation of the device of the present invention.

Referring more particularly to Fig. 1, it will be seen that I have illustrated a conventional automobile, indicated generally by the reference numeral 20, and provided with an internal combustion engine 21 to which liquid fuel is supplied through a conduit 22 leading from a fuel pump 23 to a flow measuring and signalling mechanism indicated generally at 24, from which the fuel is led, through conduit 25, to the conventional carburetor 26. A control rod 27 is provided for placing the mechanism 24 in operative condition; and, as indicated, the rod 27 terminates in a knob 28 projecting from the dashboard or instrument board 29 of the vehicle. A signal, illustrated in Fig. 1 as an electric lamp 30, is likewise shown conveniently mounted on the dashboard or instrument board 29, but it will be understood that the signal may be mounted at any convenient point within the vehicle.

Figure 2:
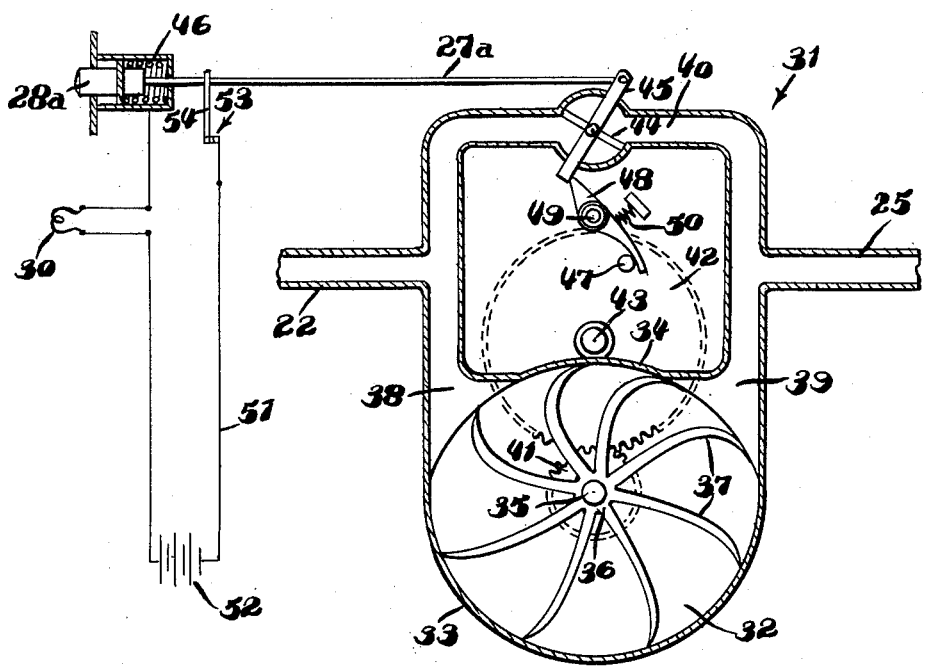
Fig. 2 is a somewhat diagrammatic illustration of one form of flow measuring signalling mechanism constructed in accordance with the present invention.
Figure 3:
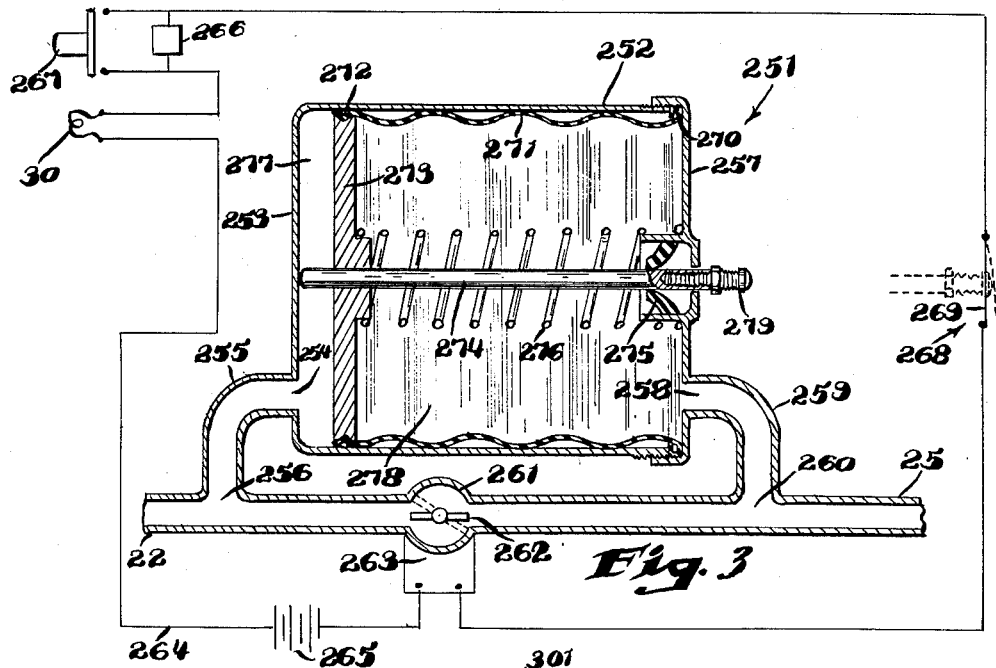
Fig. 3 illustrates a further form of my invention.
Figure 4:
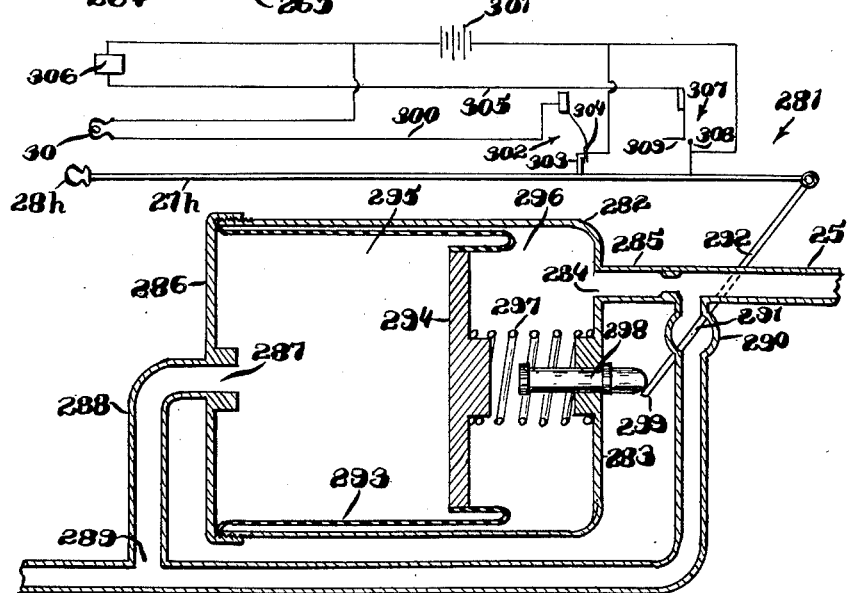
Fig. 4 shows a modified structure similar in many respects to the form of Fig. 3.

It will be understood that the block illustration at 24 in Fig. 1 represents any one of the several mechanisms illustrated in Figs. 2 to 4, since any one of those mechanisms may be mounted in the functional position indicated at 24 in Fig. 1.

Referring, now, to Fig. 2, it will be seen that I have illustrated a housing or casing, indicated generally by the reference numeral 31, and formed to provide a chamber 32. Preferably, a cross-section of the chamber 32 will be a non-circular, continuous curve, having a portion 33 formed upon one radius and a portion 34 formed upon a larger radius. The expression "a non-circular, continuous curve," as used herein, is to be interpreted to include a figure in which at least a part of the portion of longer radius is rectilinear; viz. has a radius of infinite length. A trunnion 35 is mounted upon an axis which, in the illustration, is disposed in the intersection of the major and minor diameters of the chamber. A rotor 36 is supported upon the trunnion 35 for rotation about the axis thereof, and said rotor carries a peripheral series of radiating blades 37. Each of said blades is resiliently flexible, at least near its distal end, and the blades are so proportioned and designed as to engage, and be flexed by, the peripheral wall of the chamber 32, throughout the cycle of rotation of the rotor 36. The rotor is designed to rotate in a counter-clockwise direction; and it will be perceived that the degree of flexure of the tip of each blade, in a rearward direction with respect to the direction of rotation of the rotor, will increase as the blade moves through the upper right hand sector of the chamber, and will decrease as the blade moves through the upper left hand sector thereof, but will remain constant as the blade moves through the two lower sectors of the chamber. I presently believe that the rotor may most advantageously be formed of rubberoid material such as, for instance, "neoprene."

The assembly 31 is connected in the fuel supply line between the conduits 22 and 25 in the manner illustrated; and said assembly comprises two effectively-parallel branches, one of which leads, through chamber inlet 38, the chamber 32 and chamber outlet 39, while the other leads through a valved passage 40. The function of this arrangement will be presently described.

Fixed to rotate with rotor 36 is a pinion 41 meshing with a gear 42 supported upon an axle 43 outside the chamber 32. Preferably, the trunnion 35 will be a shaft projecting, through suitable packing, to the exterior of the chamber 32, and the pinion 41 and gear 42 will be bodily located outside the chamber.

A valve 44, here shown as a butterfly type, is disposed in the passage 40 and is movable between its illustrated position, in which it will prevent flow through the passage 40, and a horizontal position, in which it will permit free flow through said passage. A lever 45 is rotationally fixed to the valve 44, and a rod 27a is pivotally connected to one end of said lever, said rod being suitably guided and leading to the knob or push button 28a which may project through the dashboard or instrument board 29, a spring 46 being suitably associated with, for instance, the button 28a and yieldably urging the same toward the left, as viewed in Fig. 2, to a position in which the valve 44 will provide for free flow through the passage 40.

The gear or wheel 42 carries a pin 47. A dog 48 is oscillably mounted upon a trunnion 49 adjacent the path of the pin 47, and one arm of the dog is normally disposed in a position to engage the lever 45 to hold the valve 44 in passage-closing position. The dog is resiliently urged to its illustrated position by a spring 50; and its opposite arm is disposed in the path of the pin 47.

An energizing circuit 51 for the signal lamp 30 leads from the conventional automobile battery 52, and a switch 53 is connected in said circuit, said switch including a movable contactor 54 connected to move with the rod 27a. The parts are so constructed and arranged that, when the valve 44 is in passage-closing position, the switch 53 will be closed to energize the signal lamp 30; and, when the valve 44 is in passage-opening position, the switch 53 will be open.

The parts are shown in positions which they occupy just before the termination of a measuring cycle. Since the passage 40 is closed by the valve 44, fuel will be flowing from the pump 23 through the conduit 22 and the chamber inlet 38 into the chamber 32, where it will impinge upon the blades 37 to drive the rotor 36 in a counterclockwise direction. The fuel leaves the chamber through the outlet 39 and the conduit 25 and flows thence to the carburetor and so to the engine in a conventional manner. Obviously, the passage of a predetermined volume of fuel through this path will produce a predetermined number of revolutions of the rotor 36; and the parts are so proportioned and designed that, for instance, the flow of one-tenth gallon of fuel through this path will produce one complete revolution of the gear or wheel 42.

As the pin 47 reaches its illustrated position, it will engage the lower arm of the dog 48, and further movement of the wheel 42 will, of course, result in camming the dog in a counter-clockwise direction to move its nose out of engagement with the lower end of the lever 45. The spring 46 will thereupon return the plunger 28a and the rod 27a to the lefthand limit of their stroke, thus shifting the lever 45 and the valve 44 to open the passage 40. Now, fuel flowing through the conduit 22 will find an easier flow path through the passage 40, and thereafter it will follow that path, and the rotor 36 will immediately stop.

Movement of the rod 27a to the left will shift the contactor 54 in the same direction to open the switch 53, and the lamp 30 will thereby be extinguished.

The parts will stop with the pin 47 in a position just to the right of the lower end of the dog 48. If, now, the vehicle driver chooses to measure his "gasoline mileage," for instance, at a given speed, he will bring his vehicle to the desiered speed, as noted by his speedometer and, when the odometer reading shows, for instance, 0 tenths, he will press the button 28a. Thus, the valve 44 will be shifted to passage-closing position, and the lower end of the lever 45 will cam past the nose of the dog 48, the dog snapping back to its illustrated position to hold the lever 45 in its illustrated position. Closure of the passage 40 will force fuel to flow through the chamber 32, thus driving the rotor 36 and the wheel 42. The light 30 will be energized immediately upon depression of the button 28a. When the wheel 42 has completed one revolution, the dog 48 will be actuated to release the lever 45, in the manner above-described, the valve will be opened and the lamp 30 will be extinguished. The operator is thus advised that the cycle has been completed; and he notes the current reading of the odometer. If, for instance, the vehicle has traveled 1.5 miles during the measured cycle, it will thus indicate that, at the selected speed, the vehicle is traveling 15 miles for each gallon of fuel consumed.

If, either accidentally or purposely, the rotor 36 should be positively restrained against such rotation while the valve 44 is closed, those of the blades 37 which are disposed in the upper, long-radius portion of the chamber 32, and which are already flexed to a substantial degree by engagement with the relatively-close chamber wall, will yield to the pressure of fuel flowing through the conduit 22—25 to permit the fuel to pass through the upper portion of the chamber 32, without rotating the rotor 36.

In Figs. 3 and 4, I have illustrated two embodiments of a different form of flow measuring and signalling device, utilizing variable-volume chambers instead of a rotor. In Fig. 3, the assembly indicated generally at 251 comprises a housing 252 having a bottom 253 formed with a port 254 connected, by a conduit 255, with a port 256 in the conduit 22, 25. The opposite end of the housing 252 is closed by a cover 257 having a port 258 connected, by conduit 259, with a second port 260 in said conduit 22, 25. A valve housing 261 is interposed, in the conduit 22, 25, between the ports 256 and 260; and a valve 262 is mounted in said housing, said valve being shiftable between its solid line position, in which it permits direct flow through the conduit 22, 25, and its dotted line position in which it prevents such flow. In the form of invention illustrated in Fig. 3, the valve is biased to its solid line position, and electric means 263, such as a solenoid, is arranged, when energized, to shift the valve 262 to its dotted line position. The circuit 264 leads from the vehicle battery 265, includes lamp 30 and a relay 266, and is normally open, being closable by a push button 267. The relay 266, of course, will hold the push button 267 in circuit-closing position, so long as the circuit 264 is closed. A normally closed switch 268, connected in the circuit, includes a movable arm 269.

One end 270 of a collapsible bellows 271 is anchored between the cover 257 and the adjacent end of the housing 252, and has a fluid-tight seal therewith. The other end 272 of said bellows is anchored, with a fluid-tight seal, upon an axially movable wall member 273, and said wall member is fixed with respect to a stem 274 which extends, through a fluid-tight gasket 275, outside the housing 252. A spring 276 yieldably urges the wall member 273 toward the left.

It will be seen that the bellows 271 and movable wall member 273 divide the space within the housing 252 into separate chambers 277 and 278, and that said chambers are inversely-variable in volume as the wall member 273 moves toward one end or the other of the housing 252.

A screw 279 is adjustably carried at the right hand end of the stem 274, and the parts are so proportioned and arranged that, as the wall 273 approaches the right hand limit of its stroke, the screw 279 will engage the switch arm 269 to open the switch 268.

As has been stated, the spring 276 tends yieldably to hold the wall 273 in its illustrated position. With the valve 262 in its solid line position, fuel will flow through the supply line 22, 25. Conventionally, the capacity of the fuel pump 23 exceeds the capacity of the carburetor 26, so that a superatmospheric pressure is maintained in the fuel line, and the pump is capable of supplying more fuel than the carburetor will receive. Consequently, in the illustrated position of the parts, fuel will flow, through the port 260, conduit 259 and port 258 to fill the chamber 278. The capacity of the chamber 278 is predetermined—for instance, one tenth gallon. If, now, the button 267 is pressed to close the circuit 264, the solenoid 263 will be energized to shift the valve 262 to its dotted line position, the relay 266 will be energized to hold the button 267 in circuit-closing position, and the lamp 30 will be lighted. Fuel can no longer flow past the valve 262, and therefore it will flow, under pressure, through the port 256, conduit 255 and port 254 into the chamber 277 where it will act upon the wall 273, as a piston, to shift said wall, against the tendency of the spring 276, toward the right. The fuel stored in the chamber 278 will thus be ejected, through port 258, conduit 259 and port 260, to flow, through conduit 25, to supply the demands of the carburetor 26. When the wall 273 has moved to a predetermined degree toward the right, whereby precisely the predetermined volume of fuel has been fed to the carburetor, the screw 279 will engage the switch arm 269 and shift the same to open the circuit 264, whereby the solenoid 263 will be deenergized to permit the valve 262, under its bias, to return to its solid line position, the lamp 30 will be extinguished, and the relay 266 will be deenergized to permit the button 267 to return, under its bias, to its illustrated position.

Now, since fuel is free to flow past the valve 262, the spring 276 will gradually return the wall 273 to its illustrated position, whereby the fuel previously introduced into the chamber 277 will be returned to the fuel supply line, and a further charge of fuel will be drawn into the chamber 278.

The flow metering and signalling device 281 illustrated in Fig. 4 comprises a housing 282 whose bottom 283 is formed with a port 284 connected, by conduit 285, with fuel supply line 25. The opposite end of the housing is closed by a cap 286 formed with a port 287 connected, by conduit 288, with a port 289 in fuel supply line 22. A valve housing 290 is interposed in said line between the port 289 and the point at which the conduit 285 enters the line, and a valve 291 is mounted in said housing and is shiftable between its illustrated position, in which it closes the normal supply line against fluid flow therethrough, and a vertical position in which it permits such flow. A lever 292 is rotationally fixed to the valve 291.

A flexible, fluid-tight sleeve 293 has one end clamped in a fluid-tight manner between the cap 286 and the adjacent end of the housing 282; and the other end of said sleeve is turned in upon itself and secured, with a fluid-tight seal, to a movable wall 294 mounted for reciprocation within the housing 282. It will be seen that the flexible wall 293 and the movable wall 294 cooperate to divide the interior of the housing into two chambers 295 and 296 of inversely-variable volume. A spring 297 bears upon the wall 294 to urge the same toward the left hand end of housing 282, as viewed in Fig. 4, where it will engage the spud surrounding port 287.

Reciprocably mounted to project through the housing bottom 283 is an actuator pin 298, the inner end of said pin being positioned for engagement by the wall 294 as the latter approaches the right hand end of its stroke, and the outer end of said pin being positioned for operative engagement with an arm 299 of the lever 292. Suitable means is provided for preventing leakage of fuel around the pin 298.

The rod 27h is operatively connected to the lever 292, and extends to the knob 28h. The lamp 30 is connected in a circuit 300 leading from the battery 301, and a switch 302 is connected in said circuit. Said switch comprises a movable contactor 303 carried on the rod 27h and a contactor 304 carried on a resiliently flexible arm. A second circuit 305 includes another signal 306, such as a buzzer, and a switch 307 is connected in the circuit 305. The switch 307 is of the wiper type, and comprises a contactor 308 movable with the rod 27h, and a relatively stationary contact 309.

When the valve 291 is in open position, the switches 302 and 307 will be open and fuel will flow through the conduit 285 and port 284 to fill the chamber 296 to a predetermined volume. At this time, of course, the wall 294 will be at the left hand end of its stroke, under the influence of the spring 297.

Now, if the knob 28h is manipulated to shift the rod 27h, lever 292 and valve 291 to their illustrated positions, normal fuel flow will be cut-off, and fuel will flow, through port 289, conduit 288 and port 287, into the chamber 295 to shift the wall 294, against the tendency of spring 297, toward the right, thereby discharging fuel through the port 284 and conduit 285 to and through the line 25 to supply the demands of the carburetor 26.

As the knob is thus shifted, the contactor 303 will engage the contactor 304 to close the circuit 300 and energize the lamp 30; and the buzzer 306 will be momentarily energized as the contactor 308 wipes past the contactor 309.

As the wall 294 approaches the right hand limit of its stroke, it will engage the pin 298 and will shift the same toward the right. Movement of the wall 294 will, of course, be relatively slow. Initial movement of pin 298 will swing the lever 292 to close the switch 307, whereby the buzzer 306 will be energized to call the operator's attention to the fact that the measuring cycle is approaching its end. As the wall 294 continues to move, the lever 292 will continue to turn in a counter-clockwise direction; and the contactor 308 will leave the contactor 309 substantially simultaneously with opening of the switch 302, whereby the lamp 30 is extinguished. As this condition is attained, the valve 291 will reach its fully-open position; fuel will again flow freely through the normal path, and the spring 297 will return the wall 294 to the left hand limit of its stroke, discharging fuel from the chamber 295 back into the fuel supply line, and drawing fuel into the chamber 296.

I claim as my invention:

1. A flow metering device comprising a housing, a flexible wall and an axially-movable wall in said housing cooperating to divide the interior of said housing into a first chamber and a second chamber, said chambers being inversely variable in volume as said movable wall moves, a fluid conduit having an inlet end adapted to be connected to a source of fluid and having an outlet end adapted to be connected to a point of use of fluid, said conduit having a valve therein, means providing communication between said first chamber and said conduit at a point between said conduit inlet end and said valve, means providing communication between said second chamber and said conduit at a point between said valve and said conduit outlet end, means for shifting said valve to conduit-closing position, means actuated by movement of said movable wall under the influence of fluid entering said first chamber, to return said valve to conduit-open position, and means actuated by such return to indicate completion of such movement of said wall.

2. The device of claim 1 in which said flexible wall is a bellows having a fluid-tight anchorage on said movable wall at one end and a fluid-tight seal at its other end with said housing adjacent said means providing communication between said second chamber and said conduit, means moving with said movable wall and having a portion projecting outside said housing, a signalling device, an electric circuit for energizing said signalling device, and a switch connected in said circuit, said projecting portion of said moving means coacting with said switch, as said movable wall approaches a position of minimum volume of said second chamber, to open said circuit.

3. The device of claim 1 in which said valve-shifting means is an electric motor, an energizing circuit for said motor, a signalling device connected in said circuit, and a switch in said circuit, and means biasing said valve to conduit-open position, said means actuated by movement of said wall coacting with said switch, as said movable wall approaches a position of minimum volume of said second chamber, to open said circuit.

4. The device of claim 1 in which said flexible wall is a fluid-tight sleeve having at one end a fluid-tight connection with said housing adjacent said means providing communication between said first chamber and said conduit, and having, at its other end, a fluid-tight connection with said movable wall, means disposed partly in said second chamber for engagement by said movable wall as the latter approaches a position of minimum volume of said second chamber, and having a portion projecting outside said housing, said valve-shifting means including a lever operatively connected to said valve and having a part disposed, when said valve is in conduit-closing position, in the path of said projecting portion whereby said valve will be shifted to conduit-open position as said movable wall reaches the limit of its stroke under the influence of fluid entering said first chamber.

5. The device of claim 4 wherein said indicating means includes a signalling device, an electric circuit for energizing said signalling device, a switch connected in said circuit, and means moving with said shifting means to close and then reopen said switch as said valve moves from conduit-closing position to conduit-full-open position.

6. The device of claim 4 wherein said indicating means includes a first signalling device, a first electric circuit for energizing said first signalling device, a first switch in said circuit, a second signalling device, a second electric circuit for energizing said second signalling device, a second switch in said second circuit, means moving with said shifting means to close said first switch as said valve is moved to conduit-closing position and to reopen said first switch only upon return of said valve to conduit-full-open position, and means moving with said shifting means to close said second switch as said valve moves toward conduit-open position and to reopen said second switch before said valve attains conduit-full-open position.

7. A flow metering device comprising a housing, a movable wall disposed in said housing and dividing the interior thereof into two chambers of inversely-variable volume, said housing being provided with a first port and with a second port, said ports opening respectively into said chambers and being disposed on opposite sides of said movable wall, conduit means leading from a source of fluid supply to a point of fluid use and by-passing said chambers, a valve in said conduit means, means providing open communication between said first port and said conduit means at a point between said source and said valve, means providing open communication between said second port and said conduit means at a point between said valve and said point of fluid use, said movable wall being yieldably biased in a direction to reduce the volume of the chamber into which said first port opens, externally-manipulable means for shifting said valve to conduit-closed position, means actuated by movement of said movable wall to a predetermined degree against its bias to shift said valve to conduit-open position, and means, responsive to such shifting of said valve to open position, to indicate the end of the travel of said wall.

8. The device of claim 7 in which said externally-manipulable means comprises a lever operatively connected to said valve and having a portion positioned adjacent said housing and in which said means actuated by movement of said movable wall comprises an element penetrating a wall of said housing, having a portion disposed in the chamber into which said second port opens, and having a further portion engageable with said lever portion, said element being engaged and moved by said movable wall to shift said lever.

9. The device of claim 7 wherein said last-named means includes a signalling device, an electric circuit for energizing said signalling device, a switch connected in said circuit, and means moving with said means actuated by movement of said movable wall to close and then reopen said switch as said valve is shifted from conduit-closed position to conduit-open position.

10. The device of claim 7 wherein said last-named means includes a first signalling device, a first electric circuit for energizing said first signalling device, a first switch in said circuit, a second signalling device, a second electric circuit for energizing said second signalling device, a second switch in said second circuit, means moving with said externally-manipulable means to close said first switch as said valve is moved to conduit-closed position and to reopen said first switch only upon return of said valve to conduit-full-open position, and means moving with said means actuated by movement of said movable wall to close said second switch as said valve moves toward conduit-open position and to reopen said second switch before said valve attains conduit-full-open position.

References Cited in the file of this patent

UNITED STATES PATENTS

| | | |
|---|---|---|
| 572,414 | Dixon | Dec. 1, 1896 |
| 2,118,079 | Goode et al. | May 24, 1938 |
| 2,576,747 | Bryant | Nov. 27, 1951 |
| 2,636,479 | Smyser | Apr. 28, 1953 |

FOREIGN PATENTS

| | | |
|---|---|---|
| 12,731 | Great Britain | 1849 |
| 509,259 | Great Britain | July 12, 1939 |